US009215042B2

(12) United States Patent
Jung et al.

(10) Patent No.: US 9,215,042 B2
(45) Date of Patent: Dec. 15, 2015

(54) APPARATUS AND METHOD FOR TRANSMITTING AND RECEIVING PACKET DATA IN A WIRELESS COMMUNICATION SYSTEM USING HYBRID AUTOMATIC REPEAT REQUEST

(75) Inventors: Jung-Soo Jung, Seongnam-si (KR); Hwan-Joo Kwon, Suwon-si (KR); Dae-Gyun Kim, Seongnam-si (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1880 days.

(21) Appl. No.: 11/969,052

(22) Filed: Jan. 3, 2008

(65) Prior Publication Data
US 2008/0192722 A1  Aug. 14, 2008

(30) Foreign Application Priority Data
Jan. 3, 2007  (KR) .................. 10-2007-0000815

(51) Int. Cl.
H04L 1/18  (2006.01)
H04W 72/04  (2009.01)
(52) U.S. Cl.
CPC ............ *H04L 1/1867* (2013.01); *H04L 1/1896* (2013.01); *H04W 72/042* (2013.01)

(58) Field of Classification Search
None
See application file for complete search history.

(56) References Cited

U.S. PATENT DOCUMENTS

| 7,426,201 | B2 | 9/2008 | Kim et al. | |
| 2003/0210668 | A1* | 11/2003 | Malladi et al. | 370/335 |
| 2005/0105494 | A1* | 5/2005 | Kim et al. | 370/335 |
| 2008/0062944 | A1* | 3/2008 | Smith et al. | 370/342 |

FOREIGN PATENT DOCUMENTS

| KR | 1020030056950 | 7/2003 |
| KR | 1020030060387 | 7/2003 |
| KR | 1020050046484 | 5/2005 |

* cited by examiner

*Primary Examiner* — Jackie Zuniga Abad
(74) *Attorney, Agent, or Firm* — The Farrell Law Firm, P.C.

(57) ABSTRACT

An apparatus and method for transmitting and receiving packet data in persistent resources in a wireless communication system using Hybrid Automatic Repeat reQuest (HARQ) are provided, in which a user buffer stores user data to be transmitted to a receiver, a controller allocates persistent resources to the receiver according to the data type of the user data and controls a Packet Start Indicator (PSI) to be included in an initial transmission subpacket, when the initial transmission subpacket is transmitted, and a transmission and reception processor transmits the user data and the PSI to the receiver and receives a response signal from the receiver.

18 Claims, 9 Drawing Sheets

APPARATUS AND METHOD FOR TRANSMITTING AND RECEIVING PACKET DATA IN A WIRELESS COMMUNICATION SYSTEM USING HYBRID AUTOMATIC REPEAT REQUEST

PRIORITY

This application claims priority under 35 U.S.C. §119(a) to a Korean Patent Application filed in the Korean Intellectual Property Office on Jan. 3, 2007 and assigned Serial No. 2007-00815, the entire disclosure of which is hereby incorporated by reference.

BACKGROUND OF THE INVENTION

1. Field of the Invention

The present invention generally relates to an apparatus and method for allocating resources in a wireless communication system. More particularly, the present invention relates to an apparatus and method for receiving packet data using persistent resources in a wireless communication system using Hybrid Automatic Repeat reQuest (HARQ).

2. Description of the Related Art

In general, the term "wireless communication system" refers to a system that conducts communications between a Mobile Station (MS) and a network by a radio link. The MS and a Base Station (BS) transmit and receive data in a predetermined Radio Frequency (RF). Typically, other nodes connected to the BS communicate with the BS by cable. To enable a plurality of users to communicate simultaneously, wireless communication systems use a variety of multiple access schemes including Code Division Multiple Access (CDMA), Frequency Division Multiple Access (FDMA), and Time Division Multiple Access (TDMA).

The multiple access schemes distinguish users by code, frequency, and time resources, respectively. Through efficient allocation of these resources, services can be provided to more users.

The wireless communication systems can be categorized largely into a voice mobile communication system, a data mobile communication system, and a mobile communication system that provides both voice and data services. To provide better communication services, the data mobile communication system requires a technique for additionally providing voice service. To satisfy this demand, the data mobile communication system has been developed to provide the voice service in the form of Voice over Internet Protocol (VoIP).

Strictly speaking, communications cannot be conducted in real time, because no matter how advanced a communication device is, it takes time. In this context, the terms 'real time', 'quasi-real time' and 'non-real time' will be defined herein, taking a simple example.

When a speaker and a listener converse facing each other, they seldom perceive a time difference. This conversation is conducted in real time. If the speaker and the listener use different languages and thus need an interpreter, they converse in quasi-real time. If they talk to each other by mail, their conversation is done in non-real time.

In general, 'real time (or real-time service)' means that even a slight time delay causes some problem to a service, such as VoIP. 'Quasi-real time (or quasi-real-time service)' is delay-tolerant to a certain degree. For example, streaming is quasi-real time. Like e-mail, 'non-real time (or non-real-time service)' tolerates a relatively long time delay. Herein below, the term 'real time (or real-time service)' covers the concept of 'quasi-real time (or quasi-real-time service)'. Real-time services include music service, broadcasting, and video calls as well as voice service. The real-time services have a relatively small amount of data and are delay-sensitive. In comparison, data services are characterized by a large amount of data, intermittent data transmissions, relatively less sensitiveness to time delay.

Therefore, the data wireless communication system allocates resources, taking into the characteristics of data service. When providing a real-time service, the wireless communication system uses persistently assigned resources (hereinafter, persistent resources) and when providing a data service being a non-real time service, it uses dynamically assigned resources (hereinafter, referred to as dynamic resources), for efficient use of resources. The persistent resource allocation scheme allocates a predetermined amount of resources to one user (or an MS) for a predetermined duration so that the user can transmit and receive data during the duration. On the other hand, the dynamic resource allocation scheme can allocate resources to a different user in each data transmission unit.

As stated before, the wireless communication systems have been developed to provide a variety of services, including real-time and non-real-time services. Hence, the persistent resource allocation scheme suitable for real-time services is required even for the data system. For convenience' sake, VoIP is taken as a communication service using persistent resources. How resources are allocated for providing the VoIP service will first be described below.

FIG. 1 illustrates an operation for providing the VoIP service in a wireless communication system.

Referring to FIG. 1, reference numeral 110 denotes a timing at which a vocoder outputs a coded voice signal and reference numeral 120 denotes a timing at which the coded voice signal from the vocoder arrives at a BS over an IP network.

During a voice conversation, a speaker (i.e. a transmitter) alone does not speak continuously. Hence, the vocoder receives, encodes, and outputs a voice signal during on-periods 111 and 113 and neither receives nor outputs a voice signal during an off-period 112. It is known that the vocoder outputs a coded signal in every 20-ms frame. Due to this vocoder characteristic, VoIP is serviced in persistent resources that are allocated every predetermined period (i.e. 20 ms). However, since the wireless communication system uses an IP network being a packet communication system, coded signals from the vocoder may arrive at the BS with different time delays from different transmission paths.

It is assumed that a first coded voice signal 111a from the vocoder is delayed over the IP network and arrives at the BS after an initial packet delay 121. Thereafter, all packets from the vocoder do not have the same time delay, that is, they have different packet inter-arrival times 122.

From the perspective of the transmitter, data transmission in persistent resources will be described. When both a BS and an MS transmit and receive data, they can be a transmitter and a receiver at the same time. For convenience' sake, the following description is made in the context of data transmission from the BS to the MS.

FIG. 2 is a flowchart of an operation for transmitting data in persistent resources in a BS in a conventional wireless communication system.

Referring to FIG. 2, the BS allocates persistent resources to a particular MS, for data transmission in step 200. The persistent resources differ depending on a used multiple access scheme. For example, the resources are a Walsh code in CDMA and subcarriers in Orthogonal Frequency Division Multiple Access (OFDMA). In step 202, the BS determines whether it is time to transmit data.

If it is time to transmit data, the BS goes to step 204 and otherwise, the BS waits until the next transmission interval in step 208. In step 204, the BS determines whether transmission data exists for the MS for the current transmission interval with the persistent resources allocated. The transmission interval can be a Transmission Time Interval (TTI) or a time slot. In the presence of transmission data for the MS, the BS transmits the data to the MS in the persistent resources in step 206. In the absence of transmission data for the MS, the BS waits until the next transmission interval in step 208.

FIG. 3 illustrates a data transmission/reception relationship when persistent resources are allocated to a particular MS in the conventional wireless communication system.

Referring to FIG. 3, the horizontal axis represents time and the vertical axis represents resources. The resources vary depending on a used multiple access scheme, as stated before. User A and User B are allocated persistent resources for use during predetermined transmission intervals.

User B may be allocated the persistent resources allocated to User A, for example, frequency or code resources for use in a different transmission interval. The allocation of the same frequency resources to different users at different times is called interlace. The interlace structure will be described with reference to FIG. 3. The persistent resources allocated to User A are intended for a predetermined time interval. Therefore, another user can use the same frequency (or code) resources for a time interval when User A does not occupy the resources. This interlace structure is possible because of the time delay of data and HARQ. To be more specific, the resources allocated to User A can be used for time intervals 301 and 302. Then the same frequency resource can be allocated to other users for the time intervals unused by User A between the time intervals 301 and 302.

HARQ is a significant technology for increasing transmission reliability and data throughput in a wireless communication system that provides data service. In general, the data service is provided in packets and thus data is referred to as packet data.

HARQ applies both Automatic Repeat reQuest (ARQ) and Forward Error Correction (FEC). In ARQ widely used for wireless data communication systems, a transmitter numbers data packets in a predetermined method and a receiver detects a lost packet by its number and requests the retransmission of the lost packet to the transmitter. In this manner, ARQ increases data transmission reliability. FEC is a transmission scheme in which data is added with redundant bits in a predetermined rule such as convolutional coding or turbo coding so that the receiver corrects bit errors caused by noise or fading during data transmission/reception and demodulates the data transmitted by the transmitter.

As described above, the data receiver performs a reverse FEC operation on received data and checks a Cyclic Redundancy Check (CRC) for decoded data in the HARQ wireless communication system. If the CRC check indicates a successful reception, the receiver feeds back an ACKnowledgment (ACK) to the transmitter and the transmitter transmits the next data packet to the receiver.

If the data received from the CRC check turns out to be erroneous, the receiver feeds back a Negative ACK (NACK) to the transmitter and the transmitter retransmits the transmitted packet to the receiver. Upon receipt of the retransmission packet, the receiver combines the previous packet with the retransmission packet, thereby achieving an energy gain. Compared to an ARQ scheme without combining, HARQ offers a better performance. During a HARQ operation, for transmission of one packet, the packet is initially transmitted, which can be followed by a plurality of retransmissions according to ACK/NACK feedback. The initial transmission packet and the retransmission packets that are transmitted for the one packet are called sub-packets. That is, subpackets associated with transmission of one packet are called, respectively an initial transmission subpacket, a second subpacket (a first retransmission subpacket), a third subpacket (a second retransmission subpacket), . . . .

Reference numeral 321 denotes an ACK/NACK feedback for a HARQ operation. As described before, the receiver feeds back a decoding result. Typically, an initial transmission subpacket is transmitted in an arbitrary time slot of persistent resources. Hence, the data receiver is not aware of the time slot in which the initial transmission occurs. Reference numerals 311 to 314 describe a data demodulation operation of User A.

The terminal of User A attempts to demodulate data in the persistent resources at time 306. Without knowledge of the initial transmission time, the terminal of User A performs the packet demodulation, taking into account all cases that can be generated. That is, the terminal of User A attempts the demodulation of the received signal at time 306, assuming that the signal is initially transmitted. If the demodulation is failed, the terminal of User A takes the next case. That is, the terminal of User A considers that the initial transmission occurred at time 305 and the first retransmission subpacket has been transmitted at time 306. Whether the demodulation is successful is usually determined based on a CRC check. The receiver attempts a data demodulation by combining the signal received at time 306 with a signal received at time 305 according to a predetermined HARQ operation and then checks whether the demodulation is successful. If the demodulation has also failed, the receiver combines all signals received at times 306, 305 and 304. That is, the demodulation is based on the assumption that the subpacket received at time 306 is the second retransmission subpacket (i.e. the third subpacket). In this manner, the demodulation is performed over every possible case. The number of demodulations is determined according to a predetermined maximum allowed retransmission number for HARQ. If the maximum retransmission number is 4 (or 5 subpackets, including an initial transmission subpacket) can be transmitted for one packet. In the illustrated case of FIG. 3, the terminal of User A attempts a data demodulation for 5 possible cases at time 306. The data demodulations in the possible cases may not be performed in the above-described order. Depending on system setting, the order of data demodulation can be determined using various combinations.

As described above, a shortcoming with the data transmission in persistent resources is a complex data demodulation process because the receiver is not aware of the initial transmission time of data received in the persistent resources. As a result, the receiver may not receive an initial transmission packet correctly and thus retransmissions may occur frequently, causing a decrease in the overall data throughput. Accordingly, there exists a need for enabling a receiver to find out an initial transmission subpacket of a packet transmitted in persistent resources in a HARQ communication system.

SUMMARY OF THE INVENTION

An aspect of the present invention is to address at least the problems and/or disadvantages and to provide at least the advantages described below. Accordingly, an aspect of exemplary embodiments of the present invention is to provide an apparatus and method for efficiently transmitting and receiving data in persistent resources in a HARQ wireless communication system.

Another aspect of the present invention is to provide an apparatus and method for reducing the number of data packet demodulations in a HARQ wireless communication system.

A further aspect of the present invention is to provide an apparatus and method for enabling a receiver to find out an initial transmission packet in a HARQ wireless communication system.

In accordance with an aspect of the present invention, there is provided an apparatus for transmitting packet data in persistent resources in a wireless communication system using HARQ, in which a user buffer stores user data to be transmitted to a receiver, a controller allocates persistent resources to the receiver according to the data type of the user data and controls a PSI to be included in an initial transmission subpacket, when the initial transmission subpacket is transmitted, and a transmission and reception processor transmits the user data and the PSI to the receiver and receives a response signal from the receiver.

In accordance with another aspect of the present invention, there is provided a method for transmitting packet data in persistent resources in a wireless communication system using HARQ, in which persistent resources are allocated to a receiver, a PSI is included in an initial transmission subpacket, when a packet is initially transmitted, the initial transmission subpacket with the PSI is transmitted in the persistent resources to the receiver, and a retransmission subpacket is transmitted in the persistent resources to the receiver during retransmission of the packet.

In accordance with a further aspect of the present invention, there is provided an apparatus for receiving packet data in persistent resources in a wireless communication system using HARQ, in which a transmission and reception processor demodulates and decodes a received packet, provides a decoding result, and transmits a response signal, and a controller is allocated persistent resources, determines whether a packet received in a current slot in the persistent resources is an initial transmission subpacket by checking whether the packet includes a PSI, if the packet does not satisfy a predetermined condition, determines that the packet is the initial transmission subpacket without checking the PSI, if the packet satisfies the predetermined condition, and provides a response signal indicating whether the packet has errors to the transmission and reception processor.

In accordance with still another aspect of the present invention, there is provided a method for receiving packet data in persistent resources in a wireless communication system using HARQ, in which persistent resources are allocated, it is determined whether a packet received in a current slot in the persistent resources is an initial transmission subpacket by checking whether the packet includes a PSI, if the packet does not satisfy a predetermined condition, and determines that the packet is the initial transmission subpacket if the packet includes the PSI, and determines that the packet is the initial transmission subpacket without checking the PSI, if the packet satisfies the predetermined condition.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
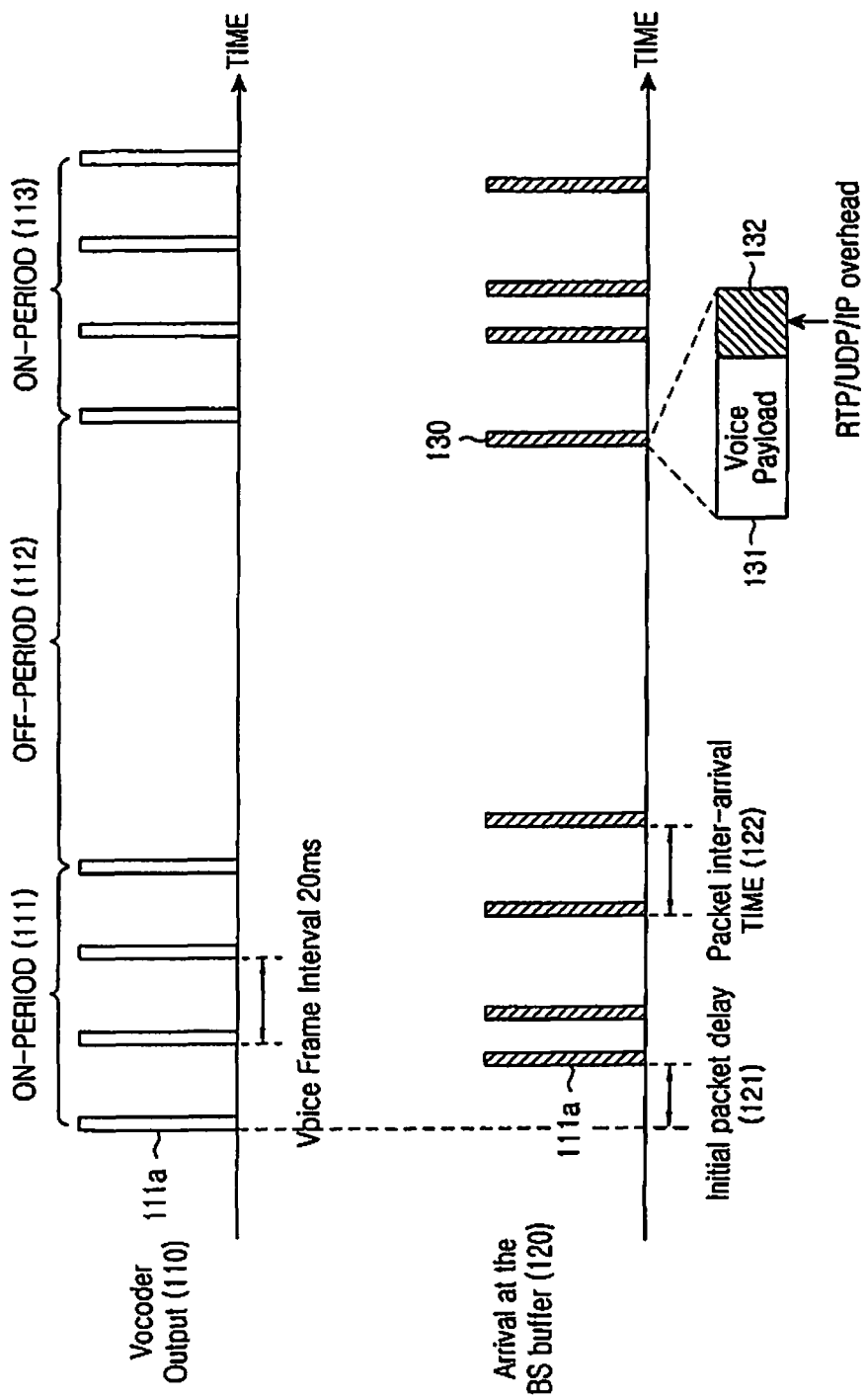
FIG. 1 illustrates an operation for providing the VoIP service in a wireless communication system.
Figure 2:
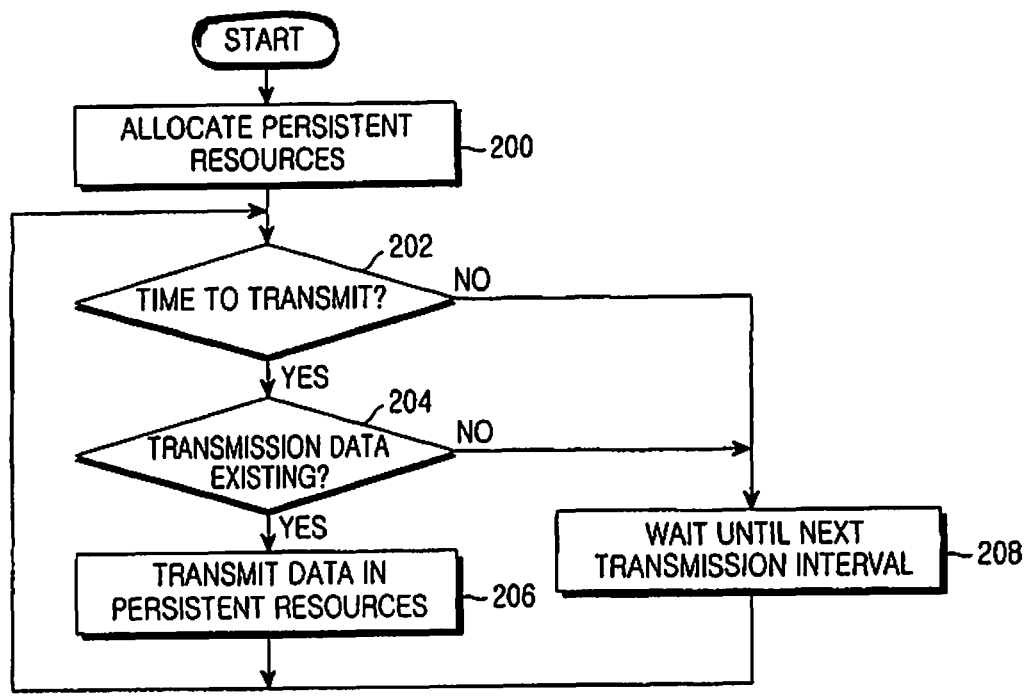
FIG. 2 is a flowchart of an operation for transmitting data in persistent resources in a BS in a conventional wireless communication system.
Figure 3:
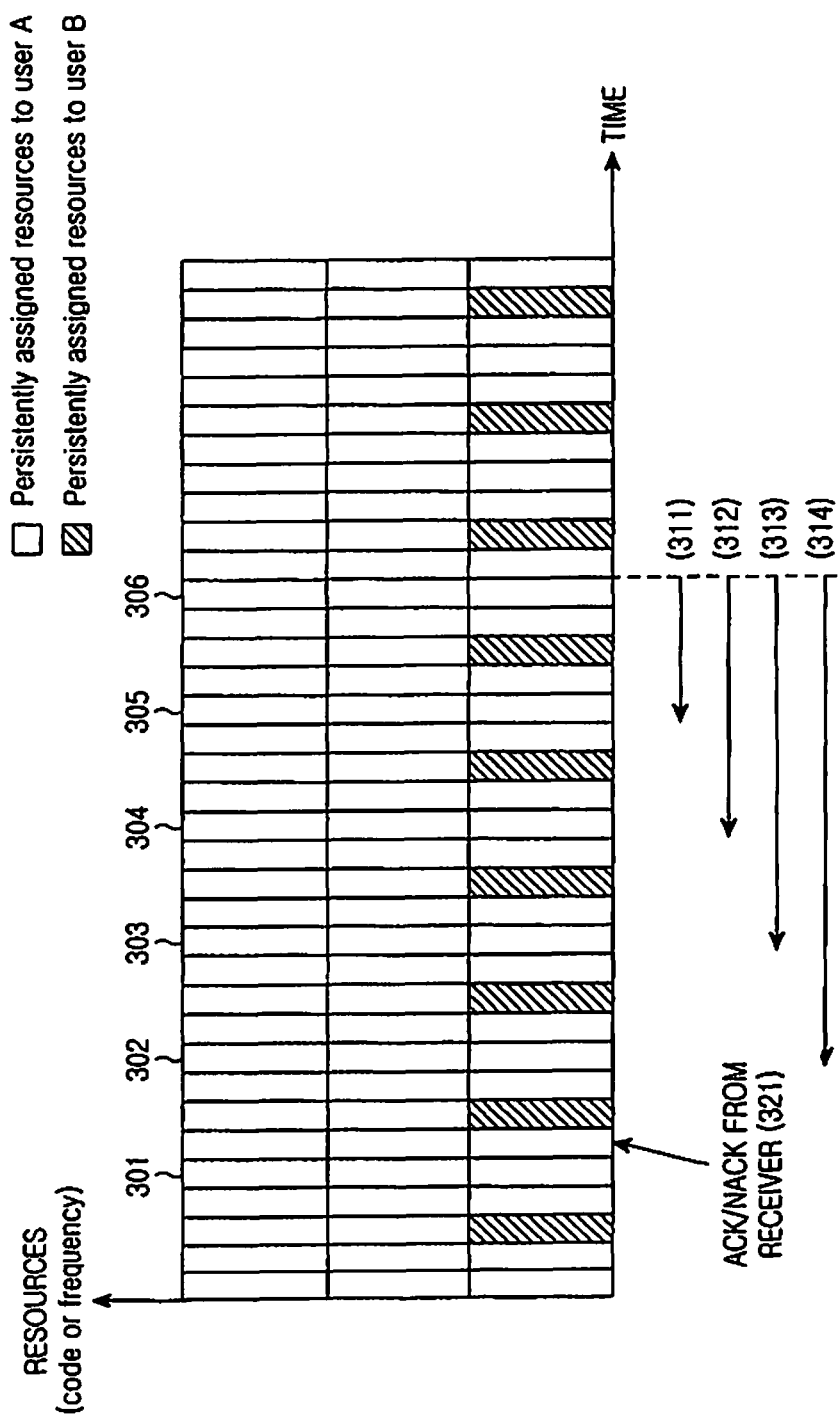
FIG. 3 illustrates a data transmission/reception relationship when persistent resources are allocated to a particular MS in the conventional wireless communication system.

Hereinafter, one exemplary embodiment of the present invention will be described with reference to the accompanying drawings. It is to be noted that the same elements are indicated with the same reference numerals throughout the drawings. The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The basic principle of packet transmission and reception according to the present invention will first be described below.

In accordance with the present invention, a BS signals information indicating an initial transmission subpacket to an MS during an initial packet transmission. The information can be transmitted along with the initial transmission subpacket in persistent resources allocated to the MS, or on a separated signaling channel. This information is referred to as a Packet Start Indicator (PSI) herein.

The MS receives a data packet in the persistent resources and determines whether the data packet is an initial transmission subpacket by checking the existence or absence of a PSI at a predetermined position in the persistent resources or checking the existence or absence of a PSI on the signaling channel. Now a description will be made of apparatuses and methods according to the present invention.

Figure 4:
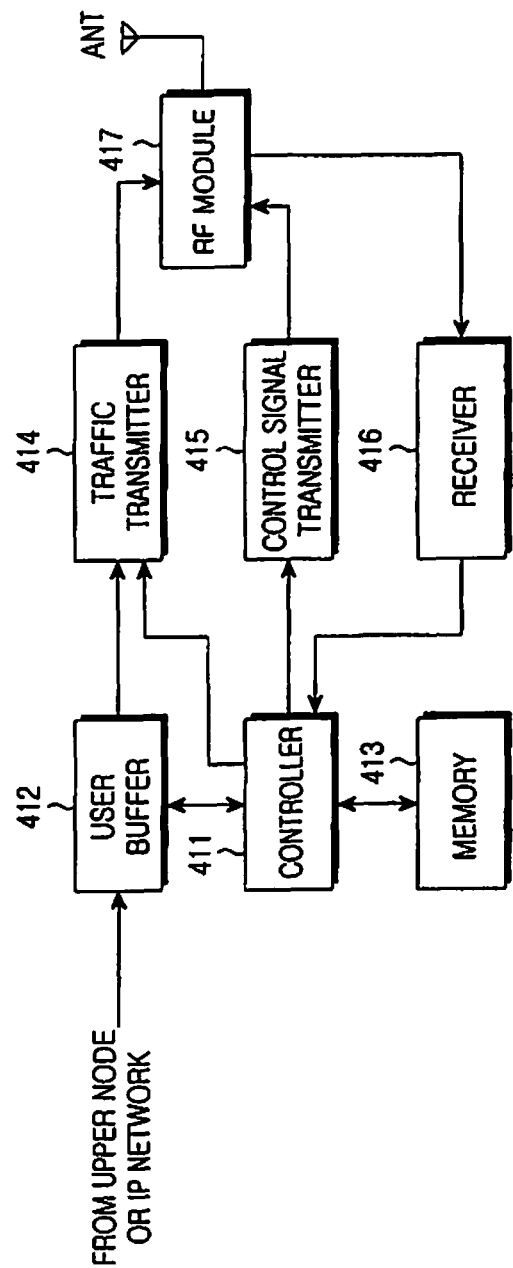
FIG. 4 is a block diagram of a BS for transmitting packets in a HARQ wireless communication system according to an exemplary embodiment of the present invention.

FIG. 4 is a block diagram of a BS for transmitting packets in a HARQ wireless communication system according to an exemplary embodiment of the present invention. It is to be noted that only the components of the BS for packet transmission to MSs are shown.

Referring to FIG. 4, a user buffer 412 receives data to be transmitted to an MS from an upper node or an Internet Protocol (IP) network and buffers the data. The buffered data is provided to a traffic transmitter 414 under the control of a controller 411. The traffic transmitter 414 encodes and modulates the received data and a PSI received from the controller 411 under the control of the controller 411. The encoding is FEC coding. If the PSI is transmitted on a separate channel, the controller 411 does not provide the PSI to the traffic transmitter 414. A control signal transmitter 415 encodes and modulates a control signal received from the controller 411. The control signal may include the PSI according to the present invention. A Radio Frequency (RF) module 417 upconverts the signals received from the traffic transmitter 414 and the control signal transmitter 415 to an RF signal in allocated resources and transmits the RF signal to the MS through an ANTenna (ANT).

The RF module 417 downconverts an RF signal received through the antenna. A receiver 416 demodulates and decodes the RF signal, and provides the decoded signal to the controller 411. The traffic transmitter 414, the control signal transmitter 415, the receiver 416, and the RF module 417 collectively form a transmission/reception processor.

The controller 411 provides overall control to the operations of the BS. Notably, the controller 411 also operates as a scheduler and schedules data by determining the occupancy status of the user buffer 412 and the presence or absence of buffered data in the use buffer 412. That is, the controller 411 determines how and when data transmission is to be carried out. For the overall control, control data and data generated during a control operation are stored in a memory 413. The operation of the controller 411 according to the present invention will be described later in more detail with reference to FIGS. 6, 7, and 8.

Figure 5:
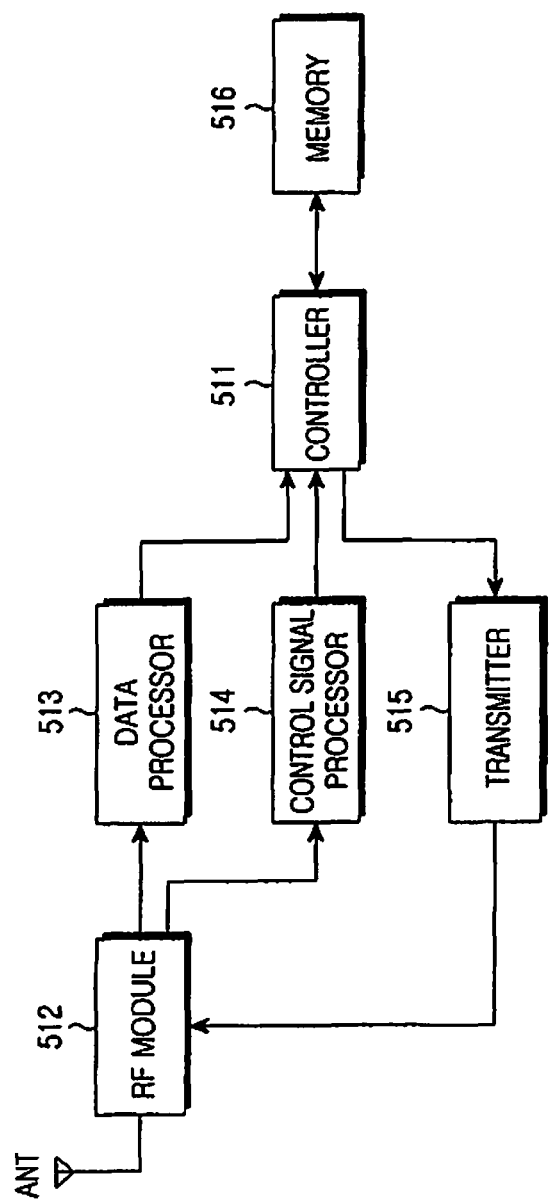
FIG. 5 is a block diagram of an MS for transmitting packets in the HARQ wireless communication system according to an exemplary embodiment of the present invention.

FIG. 5 is a block diagram of an MS for transmitting packets in the HARQ wireless communication system according to an exemplary embodiment of the present invention. It is to be noted that only the components of the MS for receiving packets from the BS are shown.

Referring to FIG. 5, an RF module 512 downconverts an RF signal received through an ANTenna (ANT) and provides user data in the downconverted signal to a data processor 513 and a control signal in the downconverted signal to a control signal processor 514. The data processor 513 demodulates and decodes the user data and provides a decoding result to a controller 511. The decoding result is a CRC check result indicating whether the received packet has errors. If the received data has no errors, it is provided to a user. Until it is provided to the user or its deletion is requested by the user, the received data without errors can be stored in a memory 516, while not shown. The MS can be configured so that if the user data includes a PSI, the data processor 513 or the controller 511 can detect a PSI, in the manufacture process of the MS, taking into account some considerations. Herein, it is assumed that the controller 511 detects the PSI.

The control signal processor 514 demodulate and decodes the control signal and provides the decoded control signal to the controller 511. A transmitter 515 encodes or/and modulates uplink transmission data and ACK/NACK information to be transmitted on an uplink ACK CHannel (ACKCH) and provides the encoded or modulated data and information to the RF module 512. The RF module 512, the data processor 513, the control signal processor 514, and the transmitter 515 collectively form a transmission/reception processor.

The controller 511 provides overall control to the operation of the MS. According to the present invention, when the BS transmits packet data in persistent resources, the controller 511 controls packet reception. The control operation will be described in more detail with reference to FIG. 6. Data needed for control of the controller 511, user data, and received data can be stored in the memory 516.

Figure 6:
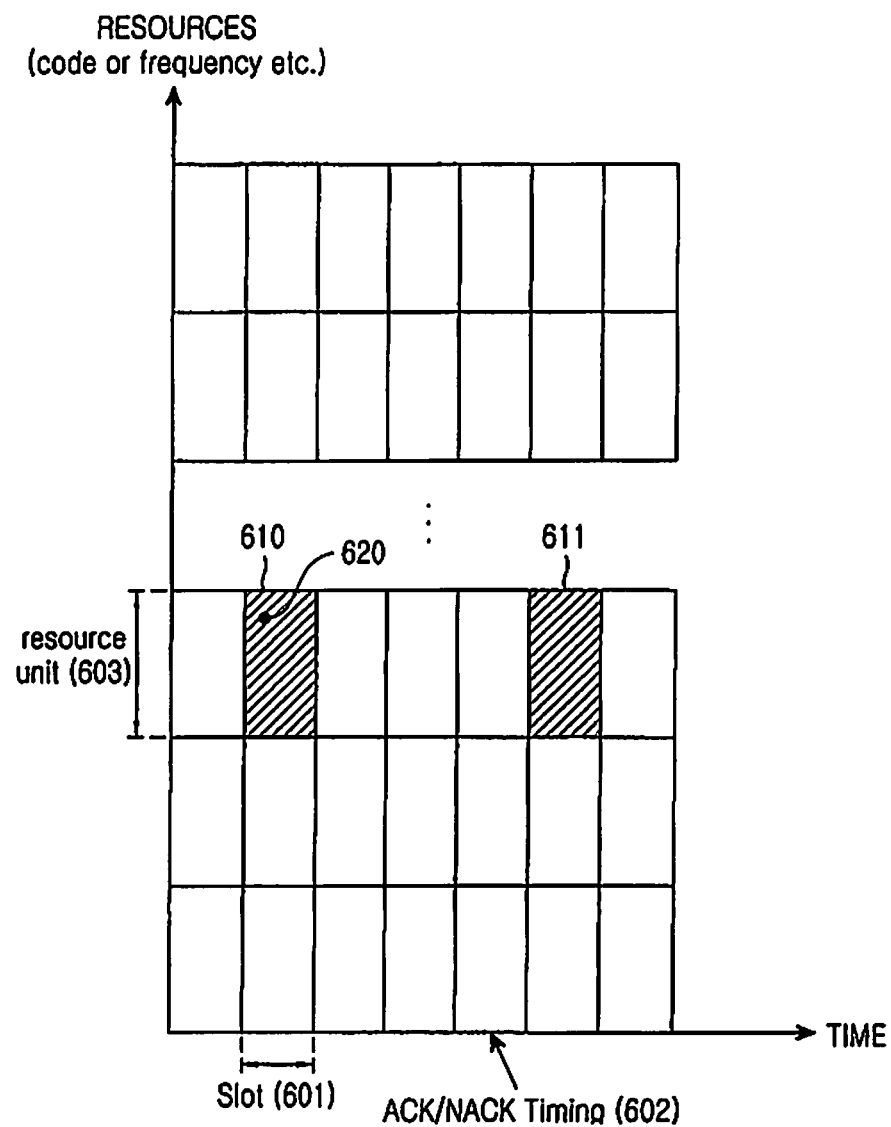
FIG. 6 illustrates transmission of an initial transmission subpacket in one persistently allocated resource unit in the HARQ wireless communication system according to an exemplary embodiment of the present invention.

FIG. 6 illustrates transmission of an initial transmission subpacket in one persistently allocated resource unit in the HARQ wireless communication system according to an exemplary embodiment of the present invention.

Referring to FIG. 6, the horizontal axis represents time. A basic time unit is a slot 601. Reference numeral 602 denotes a timing at which an ACK/NACK is fed back for a packet transmitted in persistent resources 610 where an initial transmission subpacket is delivered. The vertical axis represents system resources that the BS allocates to MSs. The system resources can be Walsh codes in CDMA or subcarriers in OFDMA. Reference numeral 603 denotes a minimum resource unit allocated to an MS. Reference numeral 610 and 611 denote resources allocated to a particular MS. Resources allocated to the MS can be time-frequency resources or time-Walsh resources.

Assuming that the BS transmits an initial transmission subpacket of a packet in the resources 610, a PSI is inserted at a predetermined position between the BS and the MS in the initial transmission subpacket. The insertion position is referred to as a PSI position.

The PSI position can be fixed to a predetermined position in persistent resources or changed at each initial transmission in a predetermined rule. In other words, the PSI position is fixed or variable. In the latter case, the PSI position can be determined according to a BS IDentifier (ID), a seed value allocated by the BS, a user ID, time (or a slot number), or the type or ID of the persistent resources. PSI positions may be distributed in one resource unit to achieve a diversity gain. The PSI positions should be known to both the BS and the MS.

As described before, the BS can insert a PSI in a predetermined resource area in a modulated initial transmission subpacket. Alternatively, the BS can insert a PSI in a predetermined position of a coded initial transmission subpacket and modulates the PSI together with the initial transmission subpacket, prior to transmission.

When the BS fails to receive an ACK for the initial transmission subpacket transmitted in the resources 610, the BS can transmit a first retransmission subpacket of the packet in the next resources 611 allocated to the MS. The BS does not transmit a PSI at this time because the first retransmission subpacket, not the initial transmission subpacket is transmitted.

In the illustrated case of FIG. 6, the PSI transmission is for the case where one resource unit is allocated to the MS. If two or more resource units are allocated to the MS, a diversity gain can be achieved by transmitting a PSI in the plurality of the resource units.

Figure 7:
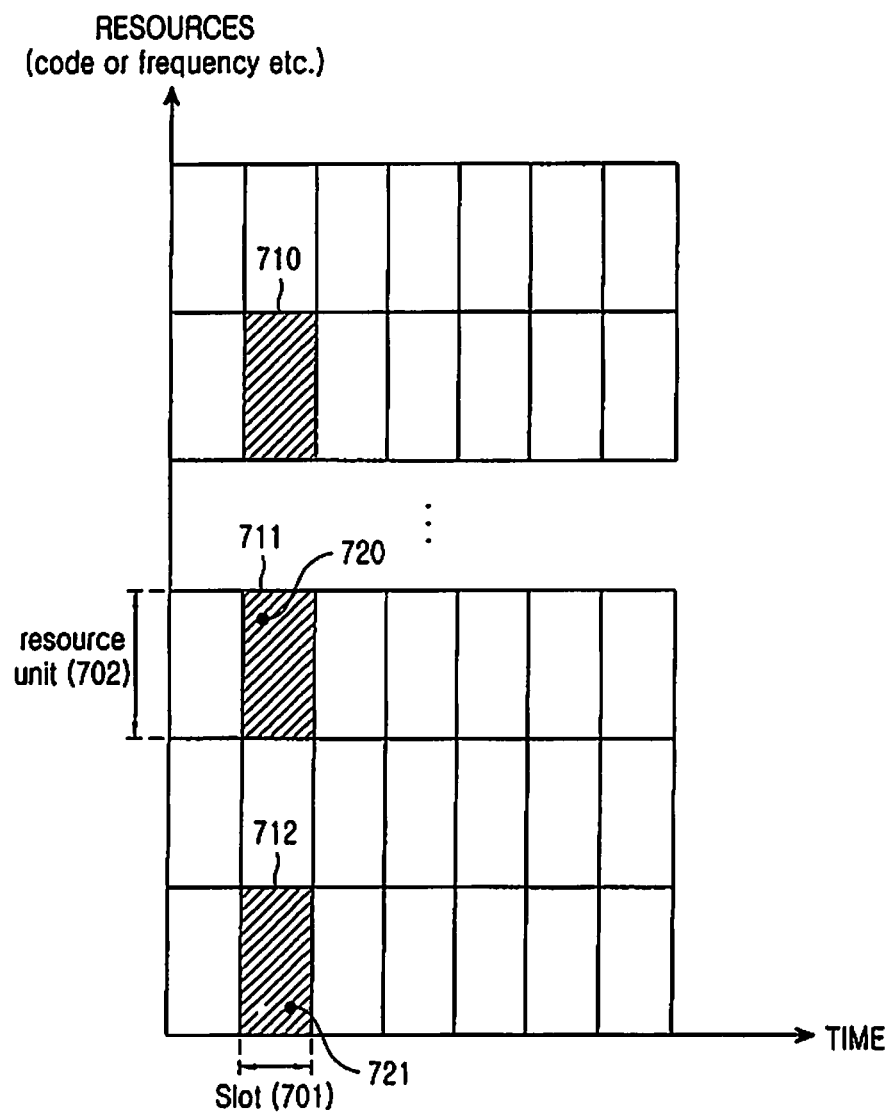
FIG. 7 illustrates transmission of an initial transmission subpacket in two or more persistently allocated resource units in the HARQ wireless communication system according to an exemplary embodiment of the present invention.

FIG. 7 illustrates transmission of an initial transmission subpacket in two or more persistently allocated resource units in the HARQ wireless communication system according to an exemplary embodiment of the present invention.

Referring to FIG. 7, the BS allocates two or more persistent resource units to the MS and transmits a PSI along with an initial transmission subpacket in the resource units. The horizontal axis represents time. A basic time unit is a slot 701. The vertical axis represents transmission resources that the BS can allocate to MSs. Reference numeral 702 denotes a minimum resource unit.

In the illustrated case of FIG. 7, the BS allocates three frequency (or Walsh) resource units to the MS. That is, the BS transmits a plurality of data streams in resource units 710, 711 and 712. When transmitting an initial transmission subpacket to the MS in a slot 501 allocated to the MS in the persistent resource units 710, 711 and 712, the BS can select one or more resource units and transmit a PSI in predetermined time-frequency (or time-Walsh) areas of the selected resource units. That is, the PSI is transmitted in an area 720 of the resource unit 711 and an area 721 of the resource unit 712, which are selected from among the resource units 710, 711 and 712 allocated to the MS.

The amount of the resources selected for PSI transmission from the resource units 710, 711 and 712 in the slot 701 and the PSI position in the selected resources are fixed or variable. In the latter case, the PSI position can be determined according to a BS ID, a seed value allocated by the BS, a user ID, time (or a slot number), or the type or ID of the persistent resources. The PSI position should be known to both the BS and the MS. If only the BS knows the PSI position, the MS should be additionally configured so as to detect the PSI.

Figure 8:
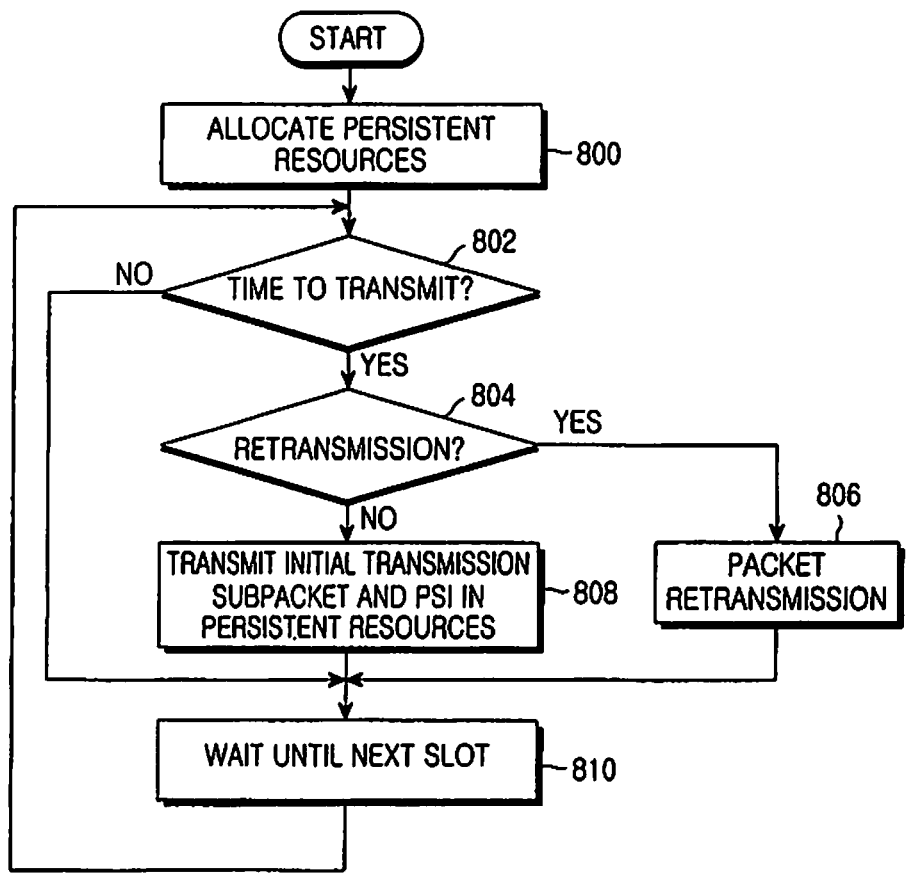
FIG. 8 is a flowchart of an operation for transmitting packets in persistent resources in the BS in the HARQ wireless communication system according to an exemplary embodiment of the present invention.

FIG. 8 is a flowchart of an operation for transmitting packets in persistent resources in the BS in the HARQ wireless communication system according to an exemplary embodiment of the present invention. This packet transmission operation is based on the premise that persistent resources have been allocated to a particular MS to which a packet is to be transmitted.

Referring to FIG. 8, the controller 411 of the BS allocates a predetermined amount of persistent resources to the MS in step 800 and determines whether it is time to transmit data to the MS in the persistent resources. If it is time to transmit data, the controller 411 proceeds to step 804 and otherwise, the controller 411 waits until the next transmission interval (i.e. slot) in step 810. In step 804, the controller 411 determines whether a current subpacket is a retransmission subpacket. In a HARQ system, retransmissions are performed generally within a system-set maximum number of retransmissions. Based on an ACK/NACK received from the MS as described with reference to FIG. 6, the BS can determine whether data will be retransmitted.

If the current subpacket is not a retransmission subpacket, the controller 411 goes to step 808. If the current subpacket is for retransmission, the controller 411 transmits the retransmission subpacket in the persistent resources to the MS in step 806. That is, when the BS transmitted a subpacket in the persistent resources in the previous slot on the same HARQ interlace and received a NACK for the subpacket, and the maximum retransmission number is not reached, the BS can retransmit data. The interface is a HARQ process. In FIG. 6, the slashed blocks form one HARQ interlace along the time axis. After the retransmission, the controller 411 waits until the next transmission slot in step 810.

If the current subpacket is not for retransmission in step 804, the subpacket is an initial transmission subpacket. In the absence of transmission data in the user buffer 412, that is, where there is no data for transmission to the MS, the controller 411 ends the transmission or waits until the next transmission slot is a flowchart of an operation for transmitting packets in persistent resources in the BS in the HARQ wireless communication system according to an exemplary embodiment of the present invention. Herein, it is assumed that data exists for transmission to the MS. Hence, the controller 411 transmits the initial transmission subpacket and a PSI in the persistent resources in step 808. Then, the controller 411 waits until the next transmission slot in step 810.

Figure 9:
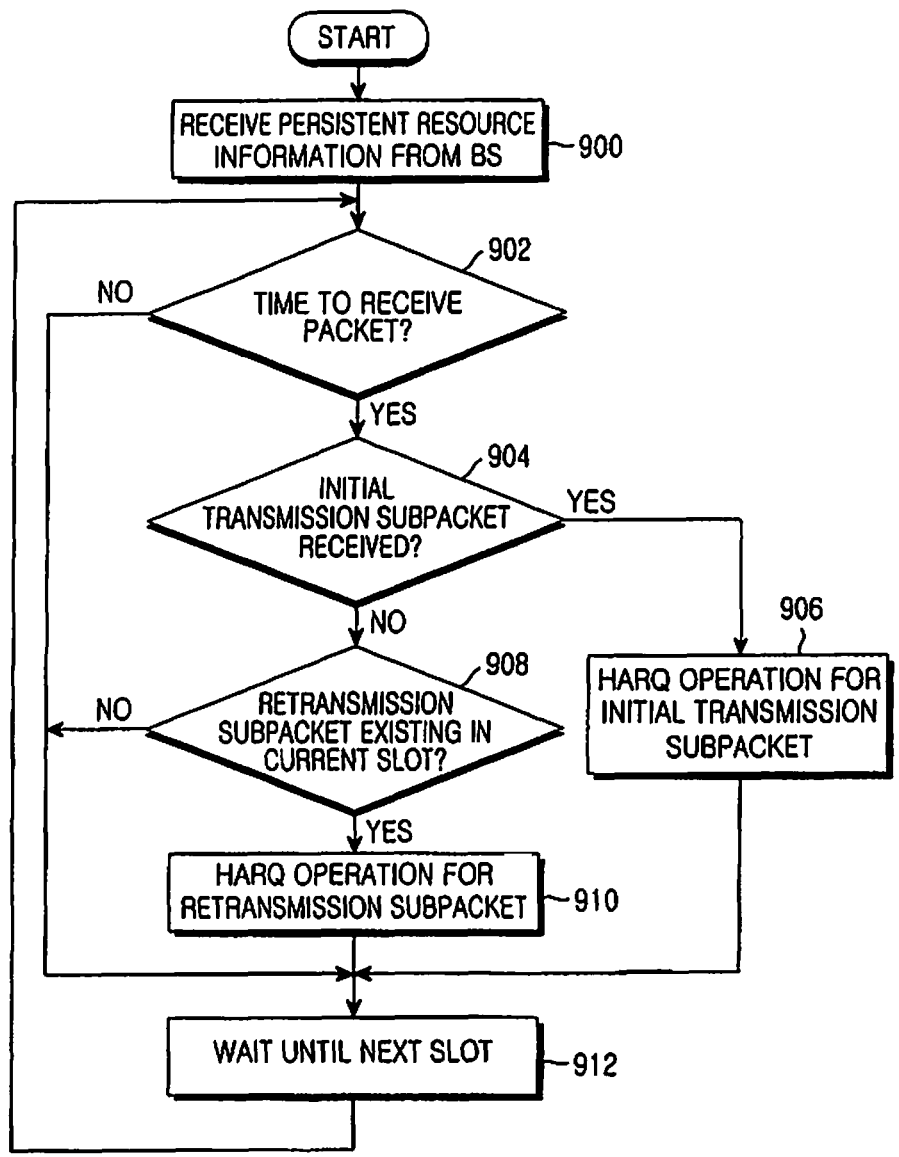
FIG. 9 is a flowchart of an operation for receiving packets in persistent resources in the MS in the HARQ wireless communication system according to an exemplary embodiment of the present invention.

FIG. 9 is a flowchart of an operation for receiving packets in persistent resources in the MS in the HARQ wireless communication system according to an exemplary embodiment of the present invention.

Referring to FIG. 9, the controller 511 of the MS receives information about persistent resources allocated to the MS by the BS through the RF module 512 in step 900. The persistent resource information can be stored in the memory 516. In step 902, the controller 511 determines whether the MS is supposed to receive a packet in a current slot. Since the persistent resource information is about allocated frequency-time or Walsh-time resources, the controller 511 can determine whether data will be received in the current slot by time information. If it is time to receive a packet, the controller 511 determines whether a new packet has been received by checking a PSI in the packet received in the persistent resources in step 904. If a slot satisfies one of the following conditions, the controller 511 can determine that the slot has an initial transmission subpacket without monitoring a PSI, thereby reducing computation volume:

(1) A packet received in the previous slot in allocated persistent resources of the same HARQ interlace is null data, that is, the BS does not transmit packet data in the previous slot.

(2) A subpacket received in the previous slot in allocated persistent resources of the same HARQ interlace is demodulated successfully and thus an ACK is fed back for the subpacket to the BS.

(3) The last retransmission subpacket is received in the previous slot in allocated persistent resources of the same HARQ interlace is null data.

In the above cases, the MS can determine that a packet received in the current slot is a new packet without detecting a PSI, thus reducing the computation volume of the controller 511. However, the above conditions are not satisfied, the controller 511 checks the presence or absence of a PSI and in the presence of the PSI, determines that the received packet is an initial transmission subpacket. In this manner, the MS can determine whether a new packet has been received.

If the current packet is an initial transmission subpacket in step 904, the controller 511 performs a HARQ operation for the initial transmission subpacket in step 906. That is, the controller 511 initializes a HARQ buffer and demodulates and decodes a signal received in the persistent resources from the BS. Then the controller 511 feeds back an ACK/NACK to the BS according to the demodulation and decoding result. In step 912, the controller 511 waits until the next slot.

If the current packet is not an initial transmission subpacket in step 904, the controller 511 determines whether there is a retransmission subpacket in the current slot in the same manner as determining the presence or absence of an initial transmission subpacket in step 908. That is, when the MS receives a subpacket in the previous slot in the persistent resources of the same HARQ interlace and feeds back a NACK for the subpacket, and a current retransmission number is less than the maximum retransmission number, the current packet is not a retransmission subpacket. In the absence of a retransmission subpacket in the current slot, the controller 511 waits until the next slot in step 912.

In the presence of a retransmission subpacket in step 908, the controller 511 performs a HARQ operation for the retransmission subpacket in step 910. That is, the controller 511 performs packet demodulation and decoding using the signal received in the current slot and a signal stored in the HARQ buffer.

While the above operation has been described in the context of data transmission from the BS to the MS, the same method is also applicable to data transmission from the MS to the BS.

As is apparent from the above description, the present invention advantageously enables a receiver to identify an initial transmission subpacket since a transmitter indicates the initial transmission subpacket when transmitting a packet in persistent resources. The resulting minimization of the number of packet combinings during a HARQ operation leads to efficient data demodulation and efficient use of the persistent resources.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for transmitting packet data in persistent resources in a wireless communication system supporting Hybrid Automatic Repeat reQuest (HARQ), comprising:
    a controller for, when a subpacket of initial transmission data is transmitted, allocating persistent resources to a receiver according to the data type of user data and generating a Packet Start Indicator (PSI) to be included in a predetermined position in the subpacket of initial transmission data to be transmitted to the receiver; and
    a transmission and reception processor for transmitting the user data and the PSI in the persistent resources to the receiver and receiving a response signal from the receiver.

2. The apparatus of claim 1, wherein when the subpacket of initial transmission data is transmitted in a plurality of persistently allocated resource units, the controller generates the PSI to be transmitted in at least two resource units selected from among the plurality of persistently allocated resource units.

3. A method for transmitting packet data in persistent resources in a wireless communication system supporting Hybrid Automatic Repeat reQuest (HARQ), comprising:
    allocating persistent resources to a receiver;
    when a packet is initially transmitted, including a Packet Start Indicator (PSI) in a predetermined position in a subpacket of initial transmission data to be transmitted from a transmitter for transmitting packet data to the receiver, and transmitting the subpacket of initial transmission data with the PSI in the persistent resources to the receiver; and
    transmitting a retransmission subpacket in the persistent resources to the receiver during retransmission of the packet.

4. The method of claim 3, wherein the transmission of the subpacket of initial transmission data comprises, when the subpacket of initial transmission data is transmitted in a plurality of persistently allocated resource units, transmitting the PSI in at least two resource units selected from among the plurality of persistently allocated resource units.

5. An apparatus for receiving packet data in persistent resources in a wireless communication system supporting Hybrid Automatic Repeat reQuest (HARQ), comprising:
    a transmission and reception processor for demodulating and decoding a received packet, providing a decoding result, and transmitting a response signal; and
    a controller for being allocated persistent resources, determining whether a packet received in a current slot in the persistent resources is a subpacket of initial transmission data by checking whether the packet includes a Packet Start Indicator (PSI) in a predetermined position in the packet received by the apparatus for receiving packet data from a transmitter, if the packet does not satisfy a predetermined condition, determining that the packet is the subpacket of initial transmission data without checking the PSI, if the packet satisfies the predetermined condition, and providing a response signal indicating whether the packet has errors to the transmission and reception processor.

6. The apparatus of claim 5, wherein the predetermined condition is that a packet received in a previous slot is a null packet.

7. The apparatus of claim 5, wherein the predetermined condition is that a packet received in a previous slot is a last retransmission subpacket according to a maximum retransmission number.

8. The apparatus of claim 5, wherein the predetermined condition is that a packet received in a previous slot is successfully demodulated.

9. The apparatus of claim 5, wherein when the transmission and reception processor receives the subpacket of initial transmission data in a plurality of persistently allocated resource units, the transmission and reception processor receives the PSI in at least two resource units among the plurality of persistently allocated resource units.

10. A method for receiving packet data in persistent resources in a wireless communication system supporting Hybrid Automatic Repeat reQuest (HARQ), comprising:
    being allocated persistent resources;
    if the packet does not satisfy a predetermined condition, determining whether a packet received in a current slot in the persistent resources is a subpacket of initial transmission data by checking whether the packet includes a Packet Start Indicator (PSI) in a predetermined position in the packet transmitted to a receiver for receiving the packet data, and determining that the packet is the subpacket of initial transmission data if the packet includes the PSI; and
    if the packet satisfies the predetermined condition, determining that the packet is the subpacket of initial transmission data without checking the PSI.

11. The method of claim 10, wherein the predetermined condition is that a packet received in a previous slot is a null packet.

12. The method of claim 10, wherein the predetermined condition is that a packet received in a previous slot is a last retransmission subpacket according to a maximum retransmission number.

13. The method of claim 10, wherein the predetermined condition is that a packet received in a previous slot is successfully demodulated.

14. The method of claim 10, wherein when the subpacket of initial transmission data is received in a plurality of persistently allocated resource units, the PSI is received in at least two resource units among the plurality of persistently allocated resource units.

15. The apparatus of claim 1, wherein the data type of user data is VoIP (Voice Over Internet Protocol) data.

16. The method of claim 3, wherein the persistent resources are allocated according to a data type of user data, and
    wherein the data type of user data is VoIP (Voice Over Internet Protocol) data.

17. The apparatus of claim 5, wherein the persistent resources are allocated according to a data type of user data, and wherein the data type of user data is VoIP (Voice Over Internet Protocol) data.

18. The method of claim 10, wherein the persistent resources are allocated according to a data type of user data, and wherein the data type of user data is VoIP (Voice Over Internet Protocol) data.

* * * * *